United States Patent
Aschaber

(10) Patent No.: US 9,586,665 B2
(45) Date of Patent: Mar. 7, 2017

(54) PROCESS FOR CONTROLLING A HYBRID NAVAL PROPULSION SYSTEM AND HYBRID PROPULSION SYSTEM

(71) Applicant: STEYR MOTORS GMBH, Steyr (AT)

(72) Inventor: Michael Aschaber, Aschach (AT)

(73) Assignee: Steyr Motors GmbH, Steyr (AT)

(*) Notice: Subject to any disclaimer, the term of this patent is extended or adjusted under 35 U.S.C. 154(b) by 0 days.

(21) Appl. No.: 14/357,934

(22) PCT Filed: Nov. 12, 2012

(86) PCT No.: PCT/AT2012/000287
§ 371 (c)(1),
(2) Date: May 13, 2014

(87) PCT Pub. No.: WO2013/071320
PCT Pub. Date: May 23, 2013

(65) Prior Publication Data
US 2014/0324256 A1     Oct. 30, 2014

(30) Foreign Application Priority Data

Nov. 14, 2011 (DE) .................. 10 2011 086 291

(51) Int. Cl.
*B63H 21/21* (2006.01)
*B63H 21/20* (2006.01)
(Continued)

(52) U.S. Cl.
CPC .............. *B63H 21/21* (2013.01); *B60K 6/48* (2013.01); *B60W 10/06* (2013.01); *B60W 10/08* (2013.01);
(Continued)

(58) Field of Classification Search
CPC .... B63H 21/20; B63H 21/202; B63H 21/205; B63H 21/207; B63H 23/12;
(Continued)

(56) References Cited

U.S. PATENT DOCUMENTS 1,342,797 A * 6/1920 Conti ................ B63G 8/10
290/4 R
8,043,132 B1 10/2011 Wyant
(Continued)

FOREIGN PATENT DOCUMENTS

AT         8288 U1      5/2006
IT    WO 2010115479 A1 * 10/2010 ............. B63H 21/20
(Continued)

OTHER PUBLICATIONS

Calder, Folding Prop Gear Test, May/Jun. 2011, Australian Yachting, pp. 40-50.*
Cordier diagram.

*Primary Examiner* — Aaron L Troost
(74) *Attorney, Agent, or Firm* — Bachman & LaPointe, PC

(57) ABSTRACT

A method for controlling the hybrid drive system of a water craft, comprising a combustion engine (1), an electric engine/generator (2), a drive train (5) having a propeller (7) and a storage battery (3), a control unit (8) and a clutch (4). In order to increase efficiency, during travel in the upper power range the electric engine (2) is additionally operated as a generator, and during travel in the middle and lower power ranges the electric engine (2) is operated with current from a storage battery (3). The drive train is designed so that the characteristic (20) thereof lies by a defined charging capacity below the point of minimum specific fuel consumption (e.g. 25), or is steeper than the characteristic (16) of a conventional construction.

12 Claims, 3 Drawing Sheets

(51) Int. Cl.
- *B63H 23/12* (2006.01)
- *B60W 10/06* (2006.01)
- *B60W 10/08* (2006.01)
- *B60W 30/188* (2012.01)
- *F02D 29/00* (2006.01)
- *B60K 6/48* (2007.10)
- *F02D 29/02* (2006.01)
- *F02D 29/06* (2006.01)
- *B60W 20/00* (2016.01)

(52) U.S. Cl.
CPC ........ *B60W 20/10* (2013.01); *B60W 30/1882* (2013.01); *B63H 21/20* (2013.01); *B63H 23/12* (2013.01); *F02D 29/00* (2013.01); *B60Y 2200/42* (2013.01); *B63H 2021/205* (2013.01); *B63H 2021/216* (2013.01); *F02D 29/02* (2013.01); *F02D 29/06* (2013.01); *F02D 2250/24* (2013.01); *Y02T 10/6221* (2013.01); *Y02T 10/6286* (2013.01); *Y02T 70/5236* (2013.01); *Y10S 903/903* (2013.01)

(58) Field of Classification Search
CPC ........ B63H 2021/205; B63H 2021/216; B60K 6/48; B60W 10/06; B60W 10/08; B60W 20/10; B60W 30/1882; F02D 29/00; F02D 29/02; F02D 29/06; F02D 2250/24; B60Y 2200/42; Y02T 10/6221; Y02T 10/6286; Y02T 70/5236

See application file for complete search history.

(56) References Cited

U.S. PATENT DOCUMENTS

| | | | |
|---|---|---|---|
| 8,727,820 B2 | 5/2014 | Stasolla et al. | |
| 2005/0106953 A1* | 5/2005 | Andersen | B63H 21/20 440/1 |
| 2009/0156068 A1* | 6/2009 | Barrett et al. | 440/3 |
| 2010/0167601 A1* | 7/2010 | Rzadki | B63H 21/16 440/1 |
| 2011/0237141 A1* | 9/2011 | Tamba | 440/3 |
| 2012/0028515 A1* | 2/2012 | Stasolla | B63H 21/20 440/3 |
| 2012/0083173 A1* | 4/2012 | McMillan | 440/6 |

FOREIGN PATENT DOCUMENTS

| | | | | |
|---|---|---|---|---|
| JP | EP 1987995 A2 * | 11/2008 | | B60K 6/365 |
| WO | 2010115479 A1 | 10/2010 | | |

\* cited by examiner

PROCESS FOR CONTROLLING A HYBRID NAVAL PROPULSION SYSTEM AND HYBRID PROPULSION SYSTEM

BACKGROUND OF THE INVENTION

The invention relates to a process for controlling a hybrid propulsion system for a watercraft, the system comprising at least a combustion engine, at least one electric machine acting as a generator and as a motor, a drive train with a propeller, a battery and a control unit, a clutch being provided between the combustion engine and the electric machine.

Hybrid propulsion systems are used in small watercraft, Yachts and also in bigger ships. Known systems are units comprising a combustion engine with an electric engine, usually operable as a motor or a generator. There can also be a plurality of electric machines. The electric machine is arranged between the combustion engine and the drive train. The clutch enables the combustion engine to be linked to the electric machine, and therefore propulsion by both machines together. A further clutch can be provided between the electric machine and the drive train.

In general, the problem with such propulsion systems is to accord the characteristic load/speed curve with the performance graph of the combustion engine. The characteristic load/speed curve is essentially that of the propeller (in the following the propeller curve), which does not fit well with the performance graph of the combustion engine. It passes throughout in regions of the performance graph with higher to high specific fuel consumption. This renders an efficient operation of the propeller difficult or even impossible. Usually, when selecting a combustion engine and a propeller, only the maximum speed of the vessel is considered.

Such a system is described in WO 2010/115479 A1. The description mentions that travel at low speed is possible either with electric drive only or with drive by the combustion engine. In the latter case, the combustion engine not being sufficiently loaded, the surplus torque can be used for charging the battery via the electric machine operating as a generator. It says further that this is advantageous foremost when travelling at low propulsion load, as this brings the operating point of the combustion engine in its performance graph nearer to the region of low specific fuel consumption. Even then, the operating point is still far away from minimal consumption, the electric machine would have to be heavily oversized. This would not only increase its bulk, the electric machine would also generate a loading current that is too high for the battery and therefore damage the battery. It would also be oversized for electric travel.

The description further states that, when travelling at medium to high speed of the vessel, the combustion engine operates at a comparatively high load and that the operating point of the combustion engine in the characteristic graph is in or near the region of minimum fuel consumption. As nothing is disclosed about the layout of the propeller, it is most likely to be conventional and the operating point is at best somehow nearer the region of minimal fuel consumption, but not in it.

With conventional layout of the propeller, its characteristic load curve intersects the load hyperbola in the point of rated power. If the characteristic load curve of the propeller passes lower, the engine would overspeed. If it passes higher, the vessel would not reach the speed corresponding to the power of the engine, because the propeller only reaches a lower number of revolutions at that torque. The conventional layout is therefore considered as optimal and thus generally accepted.

What is not considered in this divulgation is, that vessels are far from being operated in the operating point of rated power of the combustion engine and that the overall efficiency of the propulsion system for all operating states (which means over a realistic load collective) also depends on the efficiency at which the electric current is generated.

With the foregoing in mind, it is the object of the invention to minimize fuel consumption and emissions of a specific propulsion system for all states of operation, and possibly also to increase the lifetime of the combustion engine.

SUMMARY OF THE INVENTION

By controlling the generator, the joint load of the propeller and the generator is adjusted so as to bring the operating points of the combustion engine in the characteristic graph to coincide with the very points of minimum specific fuel consumption at the prevailing rotational speed of the engine. In this way, the combustion engine operates at maximum efficiency (thus with minimum specific fuel consumption) in a wide range. Thus, the electric current so generated is "cheap".

The cheap electric current so generated is available for electric propulsion in a wide power range, for assisting or replacing the combustion engine, indirectly achieving further fuel economy. This can entail further advantages. In the low power range, the specific fuel consumption of a combustion engine is particularly high. Solely electric propulsion in the low power range is more efficient thanks to the cheap electric current generated at highest efficiency. It is therefore economically advantageous if the electric machine assists the combustion engine in a wide lower range of power.

This assistance is also helpful in the medium range of power, in two situations: First, if the combustion engine is supercharged for bridging the "turbo-hole" entailed by delayed response of the turbocharger. The characteristic graph of such a combustion engine oftentimes has a depression in the middle range, where the distance to the propeller characteristic curve is small. This means that there is little power or torque, as the case may be, available for acceleration. This low agility can be remedied by the assistance of the electric machine.

Second, it is helpful with hydroplane boats during transition from displacement travel to planing travel. In the first state, acceleration against the high travelling resistance is enhanced by the assistance of the electric machine. When the boat then has risen into planing travel, resistance and torque demand is much lower.

The assistance of the electric machine can even be used for increasing the travelling speed of the vessel beyond the speed attainable with the combustion engine alone ("boost"). Thereby the lower top speed due to the layout of the propeller—also according to the invention—with drive by the combustion engine alone, can be compensated.

In an advantageous embodiment of the invention the characteristic curve of the drive train (essentially the characteristic curve of the propeller, taking account of a reduction gear, if any) and the characteristic graph of the combustion engine (represented in a diagram of torque or power over the number of revolutions, containing also the the so-called shell curves joining the points of constant specific fuel consumption) are stored in the memory of the control unit, and adjustment of the joint load for bringing the operating point to the position of minimum specific fuel consumption. Thus, the operating point of the combustion engine at a given rotational speed is raised until the point of lowest fuel consumption is reached.

In a further development of the process, the load or torque consumed by the electric machine is limited. This can be achieved in different ways: Either by a limiting value stored in the memory of the control unit, or by suitable layout of the drive train, e.g. the propeller, as disclosed below.

The proposed process results, with a realistic load collective, in a very considerably reduced fuel consumption (by up to 40%), and accordingly in lower emissions. Minimum specific fuel consumption is entailed by complete combustion, which also produces less polluting substances (CO, unburnt hydrocarbons, soot). This success surprising as is seems absurd at first sight to lower fuel consumption of a combustion engine by increasing the load.

The invention also relates to a propulsion system of a naval vessel, the layout of which improves, or even perfects, the inventive process. The drive train is laid out in such a way that its characteristic curve is situated under the point of minimum specific fuel consumption by a distance corresponding to a defined generating power at the prevailing number of revolutions. The generating power is given by the electric machine operated as a generator and limited by the battery. The characteristic curve of a drive train of this layout is nearer to the operating points of lowest specific fuel consumption than that of a conventional drive train, thus increases the efficiency. The actual operating point of minimum specific fuel consumption is then reached by the process according to the invention (control of the electric machine working as a generator).

If the layout of the propeller is according to the state of the art, its characteristic curve is far under the region of lowest specific fuel consumption. In order to reach a point of minimum specific fuel consumption from there, the generator would have to be laid out for a huge torque/power. This would entail big bulk and would produce a charging current far too high, and therefore damaging, for the battery.

Preferably, the layout of the characteristic curve of the drive train according to the invention is achieved by a propeller characteristic curve which is steeper than the characteristic curve of a propeller according to the state of the art, the latter leading up to the point of rated power. The steeper curve is already nearer the points of lowest specific fuel consumption of the combustion engine. It intersects the full load curve of the combustion engine in the point where the full load curve intersects the load hyperbola, or at lower number of revolutions. If the full load curve meets this intersection point, the load consumption of the drive train equals the rated power (but with a higher torque and at lower rotational speed). Comparison with the state of the art where layout is based on the point of rated power shows that with identical combustion engines with the layout according to the invention only a lower rotational speed can be reached. This seems a drawback at first sight, and it would be if travelling at top speed most of the time. But this is unrealistic. If top speed is required for a short period, the electric machine can assist, according to the inventive process, this is called "boost", again with the cheap current from the battery.

The characteristic curve of the drive train is largely determined by layout or shape of the propeller. Its diameter may be greater than that of a conventional propeller for instance, or the pitch of its blades may be increased. An increase of the diameter results in a higher efficiency of the propeller (according to the Cordier-diagram, see Otto Cordier, "Ähnlichkeitsbedingungen für Strömungsmaschinen", BWK Zeitschrift Nr. 10/1953, pages 337-340) and therewith in a further reduction of fuel consumption.

In an optimal layout the ratio powers of the electric machine in driving mode and of the combustion engine range between 1:3 and 1:8, preferably between 1:4 and 1:5. The electric machine then is more powerful than customary, but thanks to the invention the points of lowest specific fuel consumption can be reached in a broad range. By the battery being charged also in the higher range of power, it is fully charged most of the time, justifying a larger electric motor or its operation for a longer time.

In a further advantageous development and layout, the electric machine produces a higher torque at lower revs of the drive train, reaching the torque required by the drive train at a number of revolutions as high as possible. This provides sufficient torque in a wider lower range of power (when travelling without the combustion engine) and in the adjacent range, when the combustion engine needs assistance for acceleration, the adjacent range reaching further up to the middle range.

If bulk is a matter of concern, or if the range in which the electric machine provides a higher torque is expected to be as wide as possible, a further development consists in achieving the high torque of the electric machine over a wide range by means of a reduction gearbox. This higher torque then is the torque of the drive shaft of the reduction gear.

BRIEF DESCRIPTION OF THE DRAWINGS

In the following, the invention will be described and commented in conjunction with the drawings, in which.

DETAILED DESCRIPTION

Figure 1:
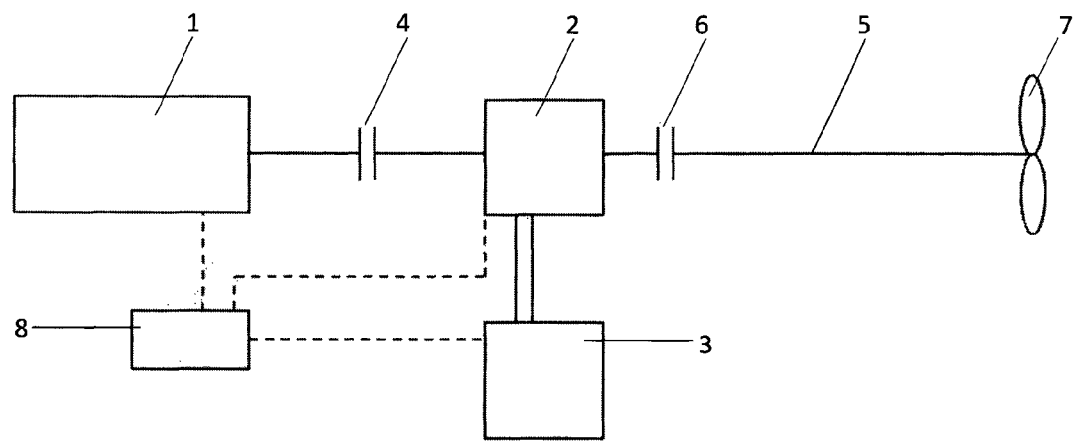
FIG. 1 is a schematic representation of a propulsion system according to the state of the art and also of the present invention.

In FIG. 1, a combustion engine has the reference number 1, an electric machine the reference number 2 and a battery reference number 3. The electric machine 2 is suitable for being operated as and engine and as a generator, or there are two electric machines, one being an engine, the other being a generator. A first separating clutch 4 is ranged between the combustion engine 1 and the electric machine 2, and a second separating clutch is ranged between the electric machine 2 and a drive train 5. The outermost end of the drive train 5 bears a propeller 7. A control unit 8 manages the combustion engine 1, the electric machine 2 and charging of the battery 3.

Figure 2:
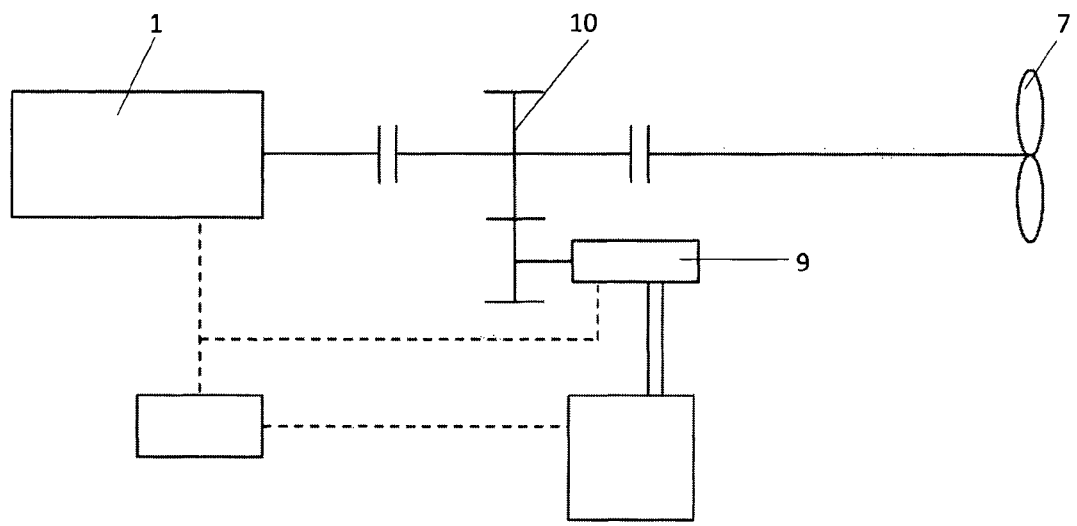
FIG. 2 is a variant of the system of FIG. 1.

FIG. 2 is a variant, distinguished from FIG. 1 by a high-revving electric machine 9 driving the drive train 5 via a reduction gearbox 10. The electric machine 9 can be for driving only and the generator disposed in a different manner. The high-revving motor 9 and the reduction gearbox 10 provide a high torque over a wide range of rotational speed, allowing travelling with electric drive only, the combustion engine being stopped and the coupling opened.

Figure 3:
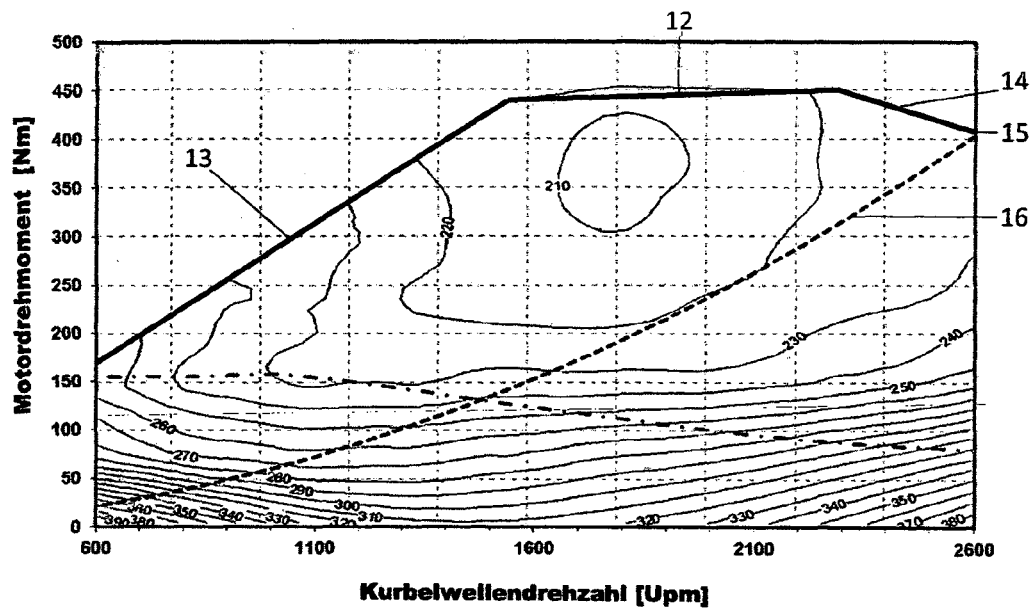
FIG. 3 is a characteristic graph of a propulsion system according to the state of the art.

FIG. 3 shows the characteristic graph of a combustion engine, here a diesel engine. The graph of a spark-ignited engine is somewhat similar, the curves differing in detail. On the abscissa, the rotational speed of the combustion engine 1 (which is—see FIG. 1—identical with that of the electric machine 2) is represented, and on the ordinate the torque. The area of the characteristic graph is limited by the full-load curve 12 on top, this curve descending with lower rotational speed (13) and at high rotational speed continues as the rated power hyperbola 14, according to the rated power. In the characteristic graph, the curves of constant specific fuel consumption are represented in a way similar to the isohypses in a geographical map. The specific fuel consumption is specified in grams per horsepower and hour. The curves of constant specific fuel consumption are referred to as conchoidal curves. It can be seen that the specific fuel consumption is a minimum in the area within the curve marked as "210". With other rotational speeds, there is also a relative minimum, corresponding each time to a maximum efficiency.

Further, a propeller characteristic curve 16 of a propeller according the state of the art is shown as a broken line, being the characteristic curve of the drive train. It (16) ends in the point of rated power 15 at the intersection with the hyperbola 14 which represents the rated power of the combustion engine 1. It can be seen that when travelling with the combustion engine only operating (all points of operation being on the characteristic curve of the propeller), the characteristic curve of the propeller is throughout in regions of high specific fuel consumption (low efficiency). Slow travel, a state of operation prevailing during most of the lifetime, or idling is particularly inefficient. It is therefore desirable, to be able to use electric drive in a wide operating range.

Figure 4:
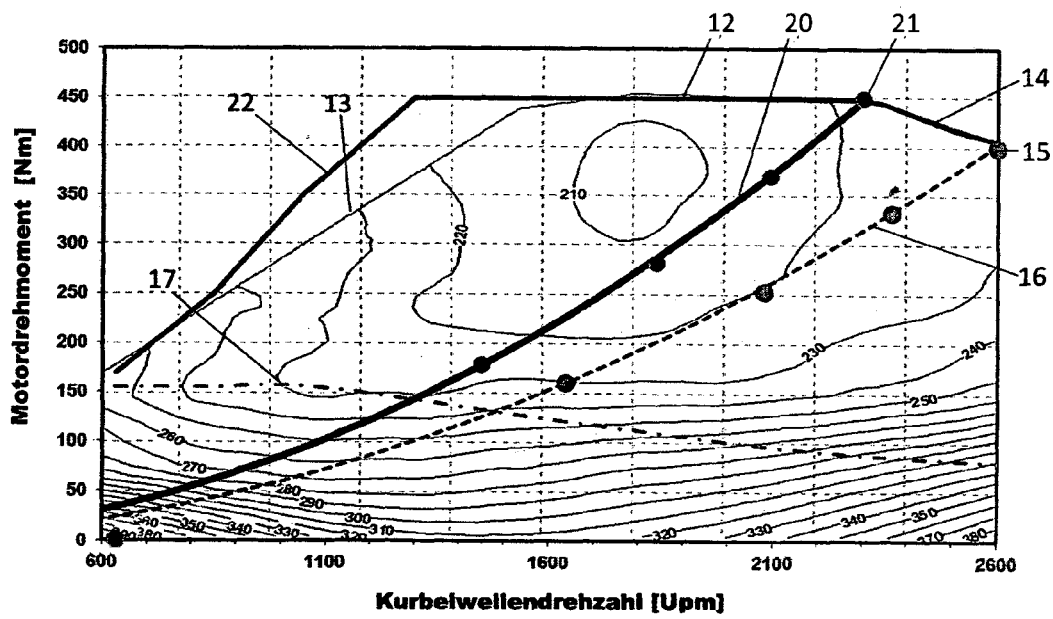
FIG. 4 is the characteristic graph of FIG. 3, a characteristic curve of a propeller according to the invention being added.

In FIG. 4, the full load curve of an electric motor/generator is shown as a semi-dotted line 17. Thanks to the invention, the electric motor/generator improves the efficiency of the entire system over the entire operating range. The electric motor can in cooperation with the combustion engine power the drive train (this is called "parallel hybrid"), see FIG. 1 and FIG. 2, as the case may be. It is important that the electric motor provides a high torque in the lower range and keeps the power constant over the rotational speed above its maximum power. This increases the range of operation with electric drive only, and the combustion does not operate in the range of high specific fuel consumption. This already is a measure to reduce fuel consumption. Further measures are to follow.

An important measure according to the invention consists in lowering the operating rotational speed of the combustion engine, in other words to deliver a demanded torque at a lower rotational speed. By this, charging the battery with maximum efficiency of the combustion engine is achieved in a wide operating range. Lowering the rotational speed of the combustion engine is achieved by using an accordingly designed propeller 7 (e.g. a larger diameter), according to an aspect of the present invention. This lowers the operating point of maximum torque 21 in the characteristic graph towards a lower rotational speed (from 2600 to 2300 rpm). The accordingly designed propeller 7 can be designed with a larger diameter (thus also lowering losses according to the Cordier-diagram) or with blades of higher pitch, or other design measures.

FIG. 4 shows the characteristic curve 20 of the drive train (essentially the propeller characteristic curve), modified according to the invention; it intersects the full load curve in point 21, at a lower rotational speed than the characteristic curve 16 of a propeller according to the state of the art, see point 15. By this, the operating points are nearer the respective points of minimum specific fuel consumption. It is important for the generation of energy to be described below that the characteristic curve of the propeller is slightly below or in the region of highest efficiency.

Lowering the rated power rotational speed according to the characteristic curve 20 of the propeller brings this characteristic curve closer to the descending branch 13 of the full load curve. This entails a lower zorque (agility) available for acceleration. With combustion engines with a significant "turbo-hole" this may lead to the vessel being unable to reach the rated power rotational speed, it would be unable to accelerate the vessel in the "turbo-hole". The additional torque provided by the electric machine helps the combustion engine and thus the original agility with the characteristic curve 16 of the propeller is achieved again. The full load curve 22 with joint drive by the electric motor and the combustion engine is shown in FIG. 4, only a fraction of the torque of the electric motor being added.

The efficiency of the generation of the electric current is essential for the economy of electric propulsion. According to the invention, it is generated in points of operation with minimum fuel consumption. In this way, the efficiency when travelling at idling speed (with propulsion by the so generated electric current) is improved by up to 40 percent, losses in the generator, inverter and the battery charging system being taken into account. The efficiency would be particularly low, if the battery were charged by the combustion engine operating at low load.

Figure 5:
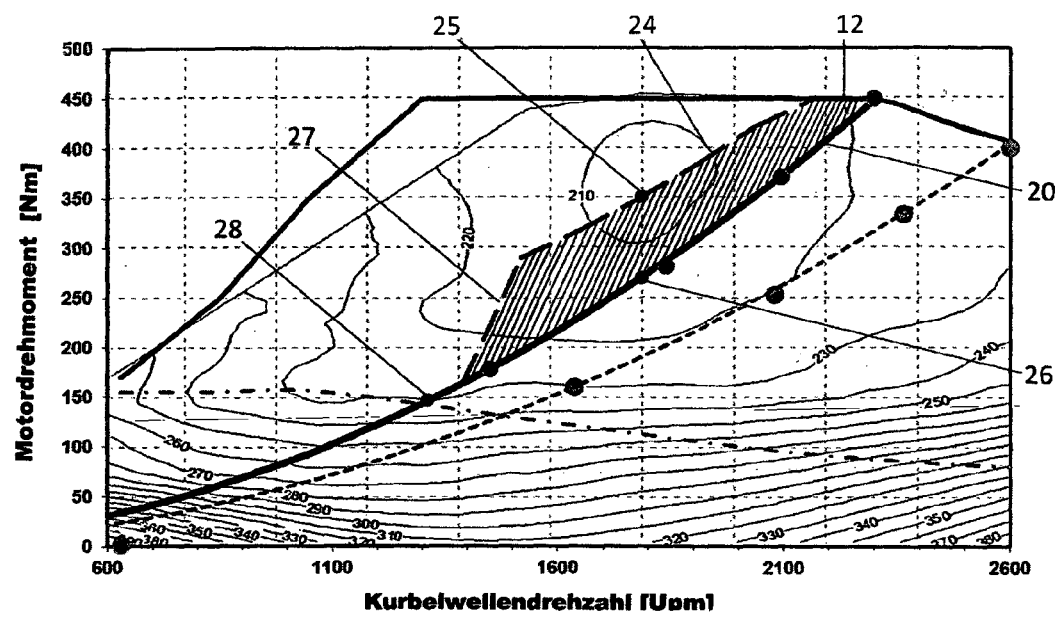
FIG. 5 is the complete characteristic graph of a propulsion system according to the invention.

FIG. 5 shows how the battery is charged with highest efficiency, resulting in "cheap" electric current. By the lowered points of operation the combustion engine already operates in regions of lower specific fuel consumption, see curve 20. But it is still at a distance from the curve linking points of minimum specific fuel consumption at various rotational speeds 24. The operating point of the combustion engine is brought into this curve 24 by driving the generator and in this way generating cheap electricity.

As an example in the characteristic graph: At 1800 revolutions (rpm) the torque consumed by the drive train 5 in the point of operation 26 on the characteristic curve of the drive train 275 Nm (Newtonmeter). The point of operation of minimum specific fuel consumption 25 is situated at 350 Nm, thus by 75 Nm higher. In order to reach that point, the electric machine operating as a generator is controlled so as to use these 75 Nm for the generation of electric current. This corresponds to a charging current which, due to electric properties of the machine and the battery, has limits and an optimum. This maximum and optimum is considered in the layout of the drive train.

Due to the propeller characteristic curve 20 being closer to the curve 24 than the characteristic curve 16 of the propeller according to the state of the art, the torque to be consumed by the generator is limited. It is much lower than it would be with the characteristic curve 16. Reaching the points of minimum consumption with a propeller according to the state of the art would require an enormous electric motor/generator.

In the characteristic graph in FIG. 5, the region in which electric current is generated in addition to propelling is hatched and circumscribed by the characteristic curve 20 of the drive train, by the curve linking points of minimum specific fuel consumption at various rotational speeds 24, by a small part 12' of the full load curve 12 and by a line 27 steeply descending to the characteristic curve 20. The line 27 meets the characteristic curve 20 somewhat higher than point 28 at the intersection of the full load curve 17 of the electric engine and the characteristic curve 20 of the drive train. Up to this point, propulsion with only electric drive is possible.

This additional charging power (higher torque at the same rotational speed) entails an increase of the efficiency of the combustion engine which improves the overall efficiency of propulsion directly and indirectly. Directly, because the combustion engine operates in its point of operation of maximum efficiency and indirectly, because the efficiency of the generation of electric current—and therewith of the combustion engine—also influences the efficiency of the electric machine operating as a motor. This, because the electricity is generated in the point of maximum efficiency of the combustion engine. With the so generated cheap electricity it is also economically sensible to operate the electric machine as a motor doubling the combustion engine also in other regions of operation.

A windfall advantage of charging the battery also with high load is an increased freedom in dimensioning the electric machine and the battery. For instance, the size of the combustion engine can be reduced and that of the electric machine increased, leaving the capacity of the battery unchanged. In this way, the ration of the rated powers of the combustion engine and of the electric machine can be in a region of 1:3 to 1:10, preferably 1:4 to 1:6.

By this layout, also the emissions can be reduced in manifold ways: The reduced fuel consumption also means a reduced quantity of exhaust gas. As higher efficiency is essentially a consequence of complete combustion, the content in CO, HC and particles of the exhaust gas is dramatically reduced. A further reduction is due to the reduced operating time of the combustion engine. If, for instance, the electric motor is operated in the lower load range during 500 hours, the energy it needs can be generated and stored in a much shorter time. The absolute value of the reduction depends, as previously said, on the load collectif (share of low-load operation), of the characteristic graph of the particular combustion engine and on the charging system of the battery. Further, servicing intervals and lifetime are increased in this way.

The invention claimed is:

1. A propulsion system of a naval vessel, comprising a combustion engine (1), at least one electric machine (2) for being operated as a motor and as a generator, a drive train (5) with a propeller (7), a battery (3) and a control unit (8), wherein the drive train (5) is laid out in such a way that a characteristic curve (20) proceeds below the points of minimum specific fuel consumption by a distance corresponding to a given maximum charging power.

2. The propulsion system of a naval vessel according to claim 1, wherein the drive train (5) layout is such that the characteristic curve of torque over rotating speed (20) of the propeller (7) in a characteristic graph of the combustion engine is steeper than a propeller characteristic curve (16) leading to a point of rated power (15) and the characteristic curve (16) of the propeller is nearer the points of minimum specific fuel consumption of the combustion engine (1).

3. The propulsion system according to claim 2, wherein the propeller characteristic curve (20) intersects a full load curve (12) of the combustion engine (1) in a point (21), that is situated at a point of intersection of the full load curve (12) with a rated power hyperbola (14), or at a lower rotational speed.

4. The propulsion system of a naval vessel according to claim 3, wherein a steeper characteristic curve (20) of the propeller (7) is achieved by increasing its diameter.

5. The propulsion system of a naval vessel according to claim 1, wherein a ratio between power consumption or power output of the electric machine and the power of the combustion engine is a ratio range of 1:3 to 1:8.

6. The propulsion system of a naval vessel according to claim 1, wherein the electric machine (2) operated as a motor provides a torque in the lower region of rotating speed of the drive train, which does not decrease until a characteristic curve (17) of the electric machine (2) intersects a characteristic curve (20) of the drive train.

7. The propulsion system of a naval vessel according to claim 6, wherein the torque of the electric machine (2), operated as a motor, is achieved by a reduction gearbox (10) joined to the electric machine (2).

8. The propulsion system of a naval vessel according to claim 1, wherein a ratio between power consumption or power output of the electric machine and the power of the combustion engine is a ratio range of 1:4 to 1:6.

9. A method for controlling a hybrid propulsion system for a watercraft, the system comprising at least a combustion engine (1), an electric machine (2) acting as a generator and as a motor, a drive train (5) comprising a propeller (7), a battery (3) and a control unit (8), a clutch (4) being provided between the combustion engine (1) and the electric machine (2), the process comprises storing in the control unit: a characteristic curve (20) of the drive train (5) and a characteristic graph of the combustion engine including its torque and specific fuel consumption, wherein the characteristic curve (20) of the drive train (5) comprises a low and a high range and a medium range overlapping the high and the low range, including adjusting the joint load of the drive train (5) and the generator (2), during travel in the high range of the characteristic curve (20), by controlling the torque consumed by the generator (2) so that the operating point of the combustion engine in the characteristic graph is brought into a point of minimum specific fuel consumption at a prevailing rotational speed on a curve linking points of minimum fuel consumption (24), said operating point is situated above an operating point of the drive train (5) at the prevailing rotational speed; and storing electric current so generated with high efficiency in the battery (7), wherein the electric current is available for the operation of the electric machine (2) as a motor in other ranges of the characteristic curve (20).

10. The method according to claim 9, releasing the clutch, during travel in the low region of power, and operating the electric machine alone, wherein during travel in the medium region of power, the electric machine (2) assists the combustion engine (1) during acceleration.

11. The method of claim 9, wherein the electric machine assist the combustion engine in the upper range of power.

12. The method according to claim 9, wherein the torque or the power consumed by the electric machine is limited by a limiting value stored in the control unit (8) or by layout of the drive train (5).

* * * * *